April 21, 1953     R. L. SWINDLER     2,635,973
APPARATUS FOR PREPRESSING CURVED LAMINATED SAFETY GLASS
Filed March 9, 1950     2 SHEETS—SHEET 1

Inventor
Rollin L. Swindler
By Nobbe & Swope
Attorneys

April 21, 1953 R. L. SWINDLER 2,635,973
APPARATUS FOR PREPRESSING CURVED LAMINATED SAFETY GLASS
Filed March 9, 1950 2 SHEETS—SHEET 2

Inventor
Rollin L. Swindler
By Nobbe & Swope
Attorneys

Patented Apr. 21, 1953

2,635,973

UNITED STATES PATENT OFFICE 2,635,973

APPARATUS FOR PREPRESSING CURVED LAMINATED SAFETY GLASS

Rollin L. Swindler, Ottawa, Ill., assignor to Libbey-Owens-Ford Glass Company, Toledo, Ohio, a corporation of Ohio Application March 9, 1950, Serial No. 148,624

9 Claims. (Cl. 154—2.7)

The present invention relates broadly to the manufacture of laminated safety glass and more particularly to an improved method and apparatus for prepressing the assembled glass and plastic laminations preliminary to final compositing.

Laminated safety glass generally comprises two or more sheets of glass having one or more layers of a suitable plastic strengthening material interposed therebetween and bonded thereto to provide a composite structure. In the manufacture of this type of safety glass, the glass sheets and plastic interlayer are first properly assembled to provide a so-called "sandwich" which is subjected first to a relatively light initial or preliminary pressing for the purpose of removing entrapped air and gas from between the laminations and to close the edges thereof, and then to a final heat and pressure treatment in an autoclave to complete the compositing of the laminations.

It is an aim of this invention to provide an improved method and apparatus by which the prepressing of the glass-plastic sandwiches can be effected in a rapid, efficient manner and which are especially adaptable to the prepressing of bent or curved sheets of laminated safety glass although not limited thereto.

Another object of this invention is to provide a method and apparatus for prepressing laminated glass sandwiches wherein the sandwiches are carried continuously forwardly and during such travel are subjected to roll pressure which is successively applied first to a longitudinal strip along the middle of the sandwich, then to a longitudinal strip along one edge of the sandwich, and finally to a longitudinal strip along the other edge thereof.

Another object of this invention is the provision of apparatus of the above character embodying a novel type of roll press by means of which a more complete and satisfactory compositing of the laminations may be accomplished with less liability of breakage of the glass sheets.

A further object of this invention is the provision of a roll press embodying a series of pairs of pressing rollers arranged to successively engage different portions of the laminated assembly transversely thereof, the individual rollers being constructed of rubber and each having lands and grooves so located that the lands of the upper rollers are directly opposite the lands of the lower roller of the respective pair.

A still further object of the invention is the provision of prepressing apparatus of the above character embodying endless conveyors associated with the pressing rollers in such a manner and synchronized therewith whereby the leading marginal edge of a bent or curved laminated glass assembly will be presented to the rollers along the tangent plane common to said rollers.

Other objects and advantages of the invention will become more apparent during the course of the following description when taken in connection with the accompanying drawings.

In the drawings, wherein like numerals are employed to designate like parts throughout the same:

Figure 1:
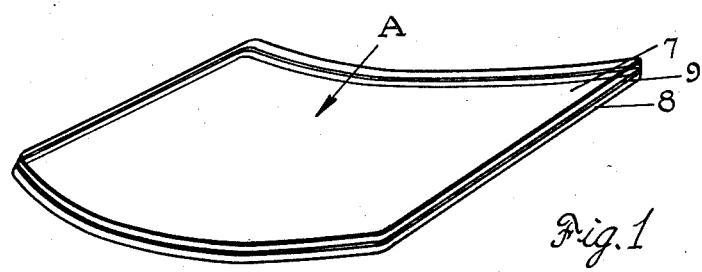
Fig. 1 is a perspective view of an assembled glass-plastic sandwich in which the sheets of glass are bent or curved longitudinally.
Figure 2:
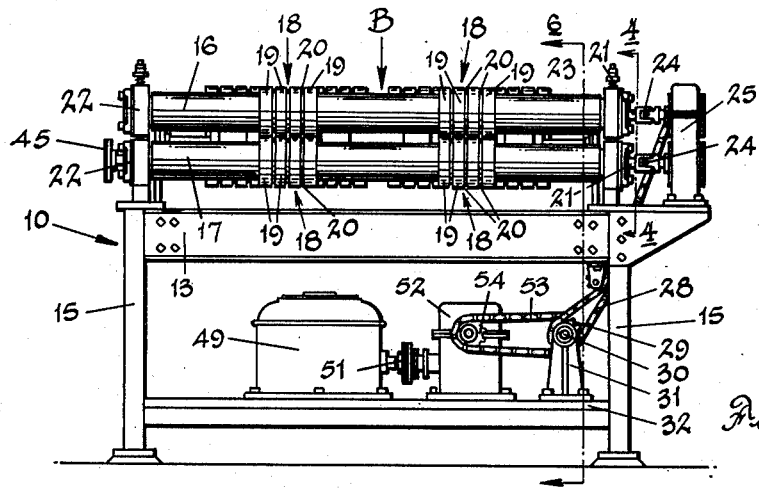
Fig. 2 is an end elevation of the prepressing apparatus constructed in accordance with this invention.
Figures 3, 4:
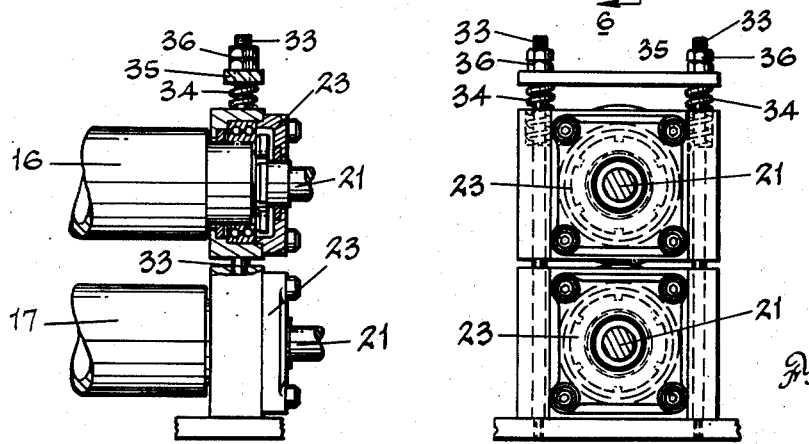
Fig. 3 is a detail view of a portion of a pair of pressing rollers, with a part of the mounting therefor being shown in section.
Fig. 4 is a vertical section taken substantially on line 4—4 of Fig. 2.

Referring now to the drawings, there is illustrated in Fig. 1 a curved or bent sheet of laminated safety glass generally indicated by the letter A and comprising the two sheets of glass 7 and 8 and an interposed layer 9 of a thermoplastic material such as, for example, polyvinyl butyral resin which are bonded together to provide a unitary structure. In the compositing of the glass-plastic laminations, the two sheets of glass 7 and 8 are first assembled with the interposed plastic layer 9 to form a so-called "sandwich." As the glass-plastic sandwiches are originally assembled, an undesirable amount of air and moisture is ordinarily confined between the layers of glass and plastic and this must be removed before a satisfactory bond can be effected.

In order to remove this air and moisture and also to obtain a sufficient initial bonding of the glass and plastic to prevent the pressing fluid used during final compositing in an autoclave from seeping in between the laminations, with resulting interference with the bonding of the plastic interlayer to the glass sheets, it is desirable that the assembled laminations be subjected to a preliminary pressing operation before being introduced into the autoclave. As pointed out above, this invention contemplates the provision of a novel and improved method and apparatus for effecting this prepressing of the assembled laminations, and it will be understood that the invention is in no way restricted to any particular process for or ingredients used in the manufacture of the laminated sheet itself.

In the drawings, there is shown a preferred form of the invention in which is provided a rectangular supporting framework designated in its entirety by the numeral 10, and comprising horizontal side members 11 and 12 and end members 13 and 14 suitably connected together at their adjacent ends and carried upon a plurality of uprights 15.

Supported upon the framework 10 are three sets of pressing rolls B, C and D, each consisting of a pair of horizontal superimposed rollers 16 and 17 provided with rubber treads 18 composed of alternate lands 19 and grooves 20. These treads may be molded upon the rollers, or if preferred may be in the nature of interchangeable rubber sleeves which can be readily replaced when they become worn.

The rollers 16 and 17 of each pair are mounted upon shafts 21 journaled at one end in bearings 22 carried at one side of the framework 10 and at their opposite ends in bearings 23 at the other side of the framework. The shafts 21 extend beyond the bearings 23 and are connected to universal joints 24 operatively connected to gear boxes 25 from which extends an input shaft 26 having fixed thereto a sprocket 27 driven by a sprocket chain 28. This chain is also trained over a sprocket 29 on the main drive shaft 30 which is rotatably mounted at its opposite ends in brackets 31 supported upon a horizontal shelf 32 secured to the framework 10. Thus, upon rotation of the shaft 30, the three pairs of pressing rolls B, C and D will be driven in unison through the sprocket chains 28.

The upper roller 16 of each pair of pressing rolls is preferably yieldably urged towards the lower roller 17 to normally bring the rubber treads 18 thereon into contact with one another. To this end, the bearings 22 and 23 for the upper roller may be slidably mounted upon vertical rods 33 and yieldably urged downwardly by springs 34 encircling said rods and bearing at their upper ends against a plate 35 held in place by nuts 36 threaded upon the upper ends of said rods.

Arranged between the pairs of rolls B and C for conveying the assembled glass-plastic laminations from the former to the latter is a conveyor means E, while a similar conveyor means F is arranged between the pairs of rolls C and D for receiving the laminated assemblies from the former and delivering them to the latter. As previously noted, the apparatus herein provided is primarily adapted for the prepressing of bent or curved sheets of glass and the conveyor means E and F are so constructed and arranged as to position the glass sheets so that the leading edge of the sandwich is horizontally disposed and in alignment with the pass between the pressing rollers. To this end, each conveyor means E and F comprises a plurality of, and as here shown three, spaced horizontal shafts 37, 38 and 39 rotatably supported at their opposite ends in bearings 40 carried by the framework 10. Fixed to each shaft are two spaced roller sections 41 and 42 about which are trained pairs of endless conveyor belts 43 and 44. The shafts 37 of conveyor means E and F are positively driven from the pressing rolls B and C respectively through a sprocket and chain drive 45, while the shafts 38 and 39 are idler shafts.

For the purpose of handling glass sheets of different curvature, the bearings 40 of shafts 37, 38 and 39 are herein provided with nuts 46 threaded upon vertical bolts 47 carried by the side members of the supporting framework so that by proper adjustment of the nuts upon the bolts, the conveyor rolls can be adjusted vertically to vary the contour of the upper flights of the conveyor belts 43 and 44.

Mounted upon the supporting shelf 32 and furnishing power to the prepressing rollers and conveyors is an electric motor 48 connected to a variable speed transmission 49 through chain and sprocket drive means 50. Driven from the transmission 49 through a sprocket and chain drive 51 is a gear reduction unit 52 which transmits power to the apparatus by a chain drive 53 over a sprocket 54 to a sprocket 55 keyed to the main drive shaft 30.

In practicing the invention, after the glass sheets and plastic interlayer have been assembled as in Fig. 1, the sandwich is passed first between the rollers 16 and 17 of the initial set of pressing rolls B. The sandwich is so fed between these rollers that the leading marginal edge thereof is engaged by the treads 18 substantially equidistantly between the opposite side edges thereof. In other words, as the sandwich passes between the rollers it is pressed in the central area thereof along the longitudinal center line of the sandwich. That is, the said rollers act to press a strip of glass centrally of the sandwich and of a width equal to the width of the treads 18.

As above described, each rubber tread 18 is preferably formed from a rubber material and is composed of alternate lands 19 and grooves 20. Whether the rubber treads are molded upon the rollers or be in the nature of interchangeable rubber sleeves, experience has shown that the use of a moderately hard or semiresilient rubber is preferable in order that the rollers apply an amount of pressure sufficient to drive out undesirable air and moisture from between the laminations and effect a preliminary sealing of the edges thereof. By way of example, the use of rubber rolls in which the Shore durometer of the rolls is in the range of 60–65 on the "A" scale have been found, in actual practice, to be satisfactory.

To assure that the treads 18 on each pair of rollers 16 and 17 exert equally opposite pressures on the assembled laminations, the tread on each upper roller is positioned so that the lands 19 and grooves 20 thereof are in coinciding parallel relation with the lands and grooves of the tread on the respective lower roller. The relative frequency, or in other words, the distance between the grooves on each tread, has been found to provide variance in the flexibility of the treads. If in a particular case it is desirable that greater flexibility be attained, the ratio of grooves to lands may be increased and the distance between grooves decreased. By this means, as the rubber tread on each roller contacts the outside faces of the sandwich, the lands figuratively "flatten out" and the treads apply a uniform amount of pressure throughout the area within the scope of the particular pressing operation. The flexibility which is thus imparted to the treads has been found to substantially reduce the liability of breakage in the pressing of glass-plastic sandwiches.

Figure 6:
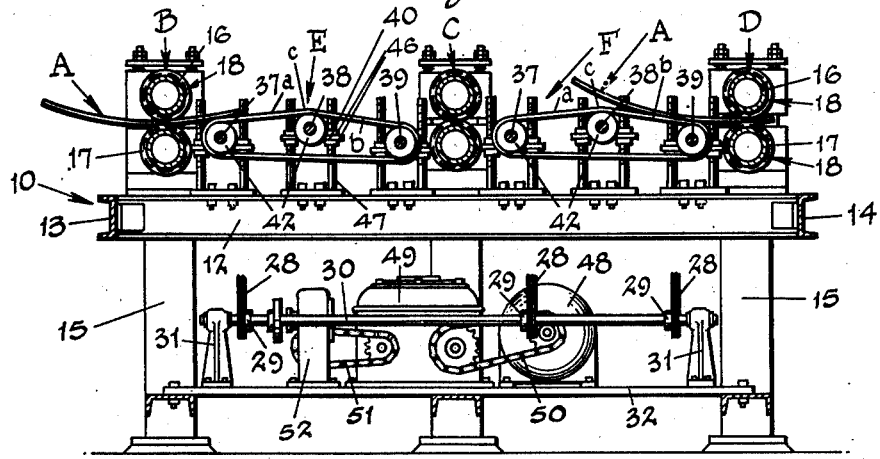
Fig. 6 is a vertical longitudinal section taken substantially on line 6—6 of Fig. 2.

Upon emerging from the pressing rolls B, the glass-plastic sandwich is received upon the conveyor means E which, as shown in Fig. 6, has an upwardly inclined portion *a* followed by a descending portion *b*. The sandwich, upon leaving the rolls B is carried by the ascending portion *a* of the conveyor and directed up and over the high point *c* thereof and then carried forwardly by the descending portion *b* so that the leading marginal edge of the sandwich is presented to the second pair of pressing rolls C along a tangent plane common to the rollers and in alignment with the pass therebetween.

The glass-plastic sandwich is then engaged by the treads 18 of the second pair of horizontal rolls C which serve to press a longitudinal strip along one marginal edge portion of the sandwich which extends from the central strip previously pressed by rolls B to one edge of the sandwich. After passing between the pressing rolls C the sandwich is received upon conveyor means F and directed first up the ascending portion *a* thereof, over the rise *c* in the conveyor and downwardly on the descending portion *b* which horizontally disposes the leading edge of the sandwich and aligns the latter with the pass between the pressing rolls D. In passing between the rolls D, a longitudinal strip along the opposite marginal edge portion of the sandwich is pressed, thereby completing the pressing of the sandwich across its entire width. Thus, the combined width of the treads 18 is at least equal to the width of the sandwich.

Figure 5:
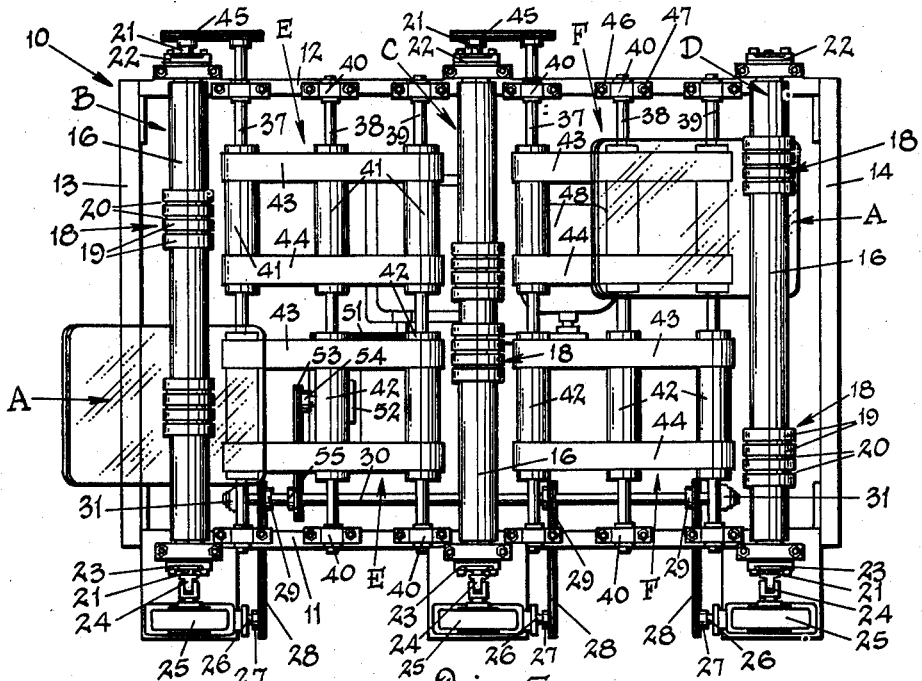
Fig. 5 is a plan view of the prepressing apparatus showing two assembled glass-plastic sandwiches being processed.

Although in the apparatus employed, the pressing rollers 16 and 17 may each be provided with but a single tread 18 in combination with single conveyors E and F to effect the pressing of only one sandwich at a time, it is preferred as shown in the drawings to provide each roller with two treads spaced from one another in combination with dual conveyors arranged side by side so that two sandwiches may be simultaneously pressed. Thus, there is provided dual channels of flow in which pressing rolls B constitute the receiving end of the apparatus regardless of the channel selected. As may be seen from the arrangement of the treads 18 in Fig. 5, the particular channel chosen is immaterial since initially a longitudinal strip along the center line of the sandwich will be pressed by rolls B followed by a pressing operation applied successively by rolls C and D to alternate marginal edge portions of the sandwich with a relatively narrow overlap existing between the areas pressed by the rolls B, C and D.

As stated above, it is essential in the manufacture of laminated safety glass that undesirable air and moisture be driven from between the laminations and a preliminary sealing of the edges thereof effected prior to final heat and pressure treatment in an autoclave which is well known in the art. Experience has shown that these objectives may be more fully realized when the glass-plastic sandwich is pressed in accordance with this invention in which the assembled laminations are moved forwardly in a predetermined path and successively pressed first along a strip substantially centrally thereof, then along the marginal portion at one side of said strip, and finally along the marginal portion at the other side of said strip. If desired, the sandwich can then be heated in an oven to render the plastic interlayer somewhat tacky, and then again pressed in the manner above described by passing it through the same or a second series of pressing rolls similar to those herein disclosed. However, it will be appreciated that this heating and additional pressing of the sandwich may not always be necessary or even desirable.

It is to be understood that the form of the invention herewith shown and described is to be taken as a preferred embodiment of the same, but that various changes in the shape, size and arrangement of parts may be resorted to without departing from the spirit of the invention or the scope of the subjoined claims.

I claim:

1. In apparatus for use in the pressing of curved glass-plastic sandwiches, three pairs of substantially horizontally aligned spaced rollers, means associated with the rollers and synchronized therewith for receiving the sandwiches from one pair and delivering them to the next pair, and means carried by the pairs of rollers for successively and separately engaging and pressing different areas of the sandwich transversely thereof.

2. In apparatus for use in the pressing of curved glass-plastic sandwiches, three pairs of substantially horizontally aligned spaced rollers, means associated with the rollers and synchronized therewith for receiving the sandwiches from one pair and delivering them to the next pair, and treads carried by the rollers and so positioned that each succeeding pair of rollers will separately press a different area of the sandwich transversely thereof.

3. In apparatus for use in the pressing of curved glass-plastic sandwiches, a plurality of pairs of substantially horizontally aligned spaced rollers, means associated with the rollers and synchronized therewith for receiving the sandwiches from one pair and delivering them to the next pair, means carried by one pair of rollers for first pressing the sandwich along a strip substantially centrally thereof, means carried by another pair of rollers for next pressing the sheet along one marginal edge thereof, and means carried by another pair of rollers for then pressing the sandwich along the opposite marginal edge thereof.

4. In apparatus for use in the pressing of curved glass-plastic sandwiches, three pairs of substantially horizontally aligned spaced rollers, means associated with the rollers and synchronized therewith for receiving the sandwiches from one pair and delivering them to the next pair, treads carried by one pair of rollers for first pressing the sandwich along a strip substantially centrally thereof, treads carried by another pair of rollers for next pressing the sheet along one marginal edge thereof, and treads carried by another pair of rollers for then pressing the sandwich along the opposite marginal edge thereof, the combined width of the treads being relatively greater than the width of the sandwich so that the sandwich is pressed across its entire width.

5. In apparatus for use in the pressing of curved glass-plastic sandwiches, three pairs of substantially horizontally aligned spaced rollers, means associated with the rollers and synchronized therewith for receiving the sandwiches from one pair and delivering them to the next pair, rubber treads carried upon the circumferences of each pair of rollers, said treads comprising parallelly arranged lands and grooves aligned with one another for applying equally opposite pressures upon the sandwich, the treads carried by one pair of rollers first pressing the sandwich along a strip substantially centrally thereof, the treads carried by another pair of rollers next pressing the sandwich along one marginal edge thereof, and the treads carried by another pair of rollers then pressing the sandwich along the opposite marginal edge thereof, the combined width of the treads being relatively greater than the width of the sandwich so that the sandwich is pressed across its entire width.

6. In apparatus for use in the pressing of curved glass-plastic sandwiches, three pairs of substantially horizontally aligned spaced rollers, means associated with the upper roller of each pair of yieldably urging said roller downwardly toward the lower roller, means associated with the rollers and synchronized therewith for receiving the sandwiches from one pair and delivering them to the next pair, treads carried upon the circumferences of each pair of rollers, said treads comprising parallelly arranged lands and grooves aligned with one another for applying equally opposite pressures to the sandwich, the treads carried by one pair of rollers first pressing the sandwich along a strip substantially centrally thereof, the treads carried by another pair of rollers next pressing the sandwich along one marginal edge thereof, and the treads carried by another pair of rollers then pressing the sandwich along the opposite marginal edge thereof, the combined width of the treads being relatively greater than the width of the sandwich so that the sandwich is pressed across its entire width.

7. In apparatus for use in the pressing of curved glass-plastic sandwiches, three pairs of substantially horizontally aligned spaced rollers, means associated with the upper roller of each pair for yieldably urging said roller downwardly toward the lower roller, conveyor means associated with the rollers and synchronized therewith for receiving the sandwiches from one pair and delivering them to the next pair, treads carried upon the circumferences of each pair of rollers, said treads comprising parallelly arranged lands and grooves aligned with one another for applying equally opposite pressures to the sandwich, the treads carried by one pair of rollers first pressing the sandwich along a strip substantially centrally thereof, the treads carried by another pair of rollers next pressing the sandwich along one marginal edge thereof, and the treads carried by another pair of rollers then pressing the sandwich along the opposite marginal edge thereof, the combined width of the treads being relatively greater than the width of the sandwich so that the sandwich is pressed across its entire width, and driving and synchronizing means for the pressing rollers and conveyor means.

8. In apparatus for use in the pressing of curved glass-plastic sandwiches, three pairs of substantially horizontally aligned spaced rollers, conveyor means associated with the rollers for receiving the sandwiches from one pair of rollers and delivering them to the next pair, means associated with the conveyor means to effect vertical adjustment of said conveyor means whereby the leading marginal edge of the sandwich is aligned with the pass between each pair of rollers, treads carried upon the circumferences of each pair of rollers, said treads comprising parallelly arranged lands and grooves aligned with one another for applying equally opposite pressures to the sandwich, the treads carried by one pair of rollers first pressing the sandwich along a strip substantially centrally thereof, the treads carried by another pair of rollers next pressing the sandwich along one marginal edge thereof, and the treads carried by another pair of rollers then pressing the sandwich along the opposite marginal edge thereof, the combined width of the treads being relatively greater than the width of the sandwich so that the sandwich is pressed across its entire width, and driving and synchronizing means for the pressing rollers and conveyor means.

9. In apparatus for use in the pressing of curved glass-plastic sandwiches, three pairs of substantially horizontally aligned spaced rollers, means associated with the rollers and synchronized therewith for receiving the sandwiches from one pair and delivering them to the next pair, and treads carried by said rollers, the treads carried by each pair of rollers being laterally offset with respect to the treads carried by the other pairs of rollers whereby the treads of each pair of rollers will engage and separately press a different area of the sandwich transversely thereof, the combined width of the treads being relatively greater than the width of the sandwich so that the sandwich is pressed across its entire width.

ROLLIN L. SWINDLER.

References Cited in the file of this patent

UNITED STATES PATENTS

| Number | Name | Date |
|---|---|---|
| 1,190,698 | Abramsen | July 11, 1916 |
| 1,871,982 | Geyer | Aug. 16, 1932 |
| 1,897,862 | Randall | Feb. 14, 1933 |
| 1,944,277 | Schoepfer | Jan. 23, 1934 |
| 2,025,115 | Lytle | Dec. 24, 1935 |
| 2,142,445 | Helwig | Jan. 3, 1939 |
| 2,431,353 | Varner | Nov. 25, 1947 |
| 2,459,295 | Skoog | Jan. 18, 1949 |
| 2,525,980 | Walters | Oct. 17, 1950 |